United States Patent [19]

Hoever et al.

[11] Patent Number: 5,060,550
[45] Date of Patent: Oct. 29, 1991

[54] ROCKET NOZZLE SNUBBER

[75] Inventors: Jeffrey P. Hoever, Santa Clara; Richard L. Reginato, Sunnyvale; Frederic M. Bay, Sunnyvale; Claudia E. Rolon, Sunnyvale; Michael Bazigos, Belmont; Rolla W. Allen, Santa Clara, all of Calif.

[73] Assignee: The United States of America as represented by the Secretary of the Navy, Washington, D.C.

[21] Appl. No.: 658,163

[22] Filed: Feb. 19, 1991

[51] Int. Cl.$^5$ ............................ F41F 3/07; B63H 11/00
[52] U.S. Cl. .................................... 89/1.809; 60/271; 239/265.11
[58] Field of Search ............. 60/271; 239/265.11, 239/265.43; 89/1.809, 1.810; 102/374, 381

[56] References Cited

U.S. PATENT DOCUMENTS

| | | | |
|---|---|---|---|
| 3,279,192 | 10/1966 | Hull et al. | 60/271 |
| 3,568,929 | 3/1968 | Butler et al. | 239/265.11 |
| 4,007,586 | 2/1977 | McDermott | 60/271 |
| 4,949,618 | 8/1990 | Tarlano | 89/1.809 |
| 4,967,599 | 11/1990 | Donguy | 60/271 |

*Primary Examiner*—David H. Brown
*Attorney, Agent, or Firm*—Kenneth L. Warsh; Robert M. Wohlfarth

[57] ABSTRACT

Stress from the ignition of a rocket is transferred from the rocket nozzle to the actuators and flexible joint seal which move the nozzle causing potential failure of the actuators. This stress can be relieved by using a snubber in the form of a flexible hollow conical toroidal bladder filled with incompressible fluid fitted snugly between the nozzle and the main body of the rocket. Such a snubber transfers the stress to the main body of the rocket through the snubber while deforming to allow the rocket nozzle to slew in response to control commands.

3 Claims, 3 Drawing Sheets

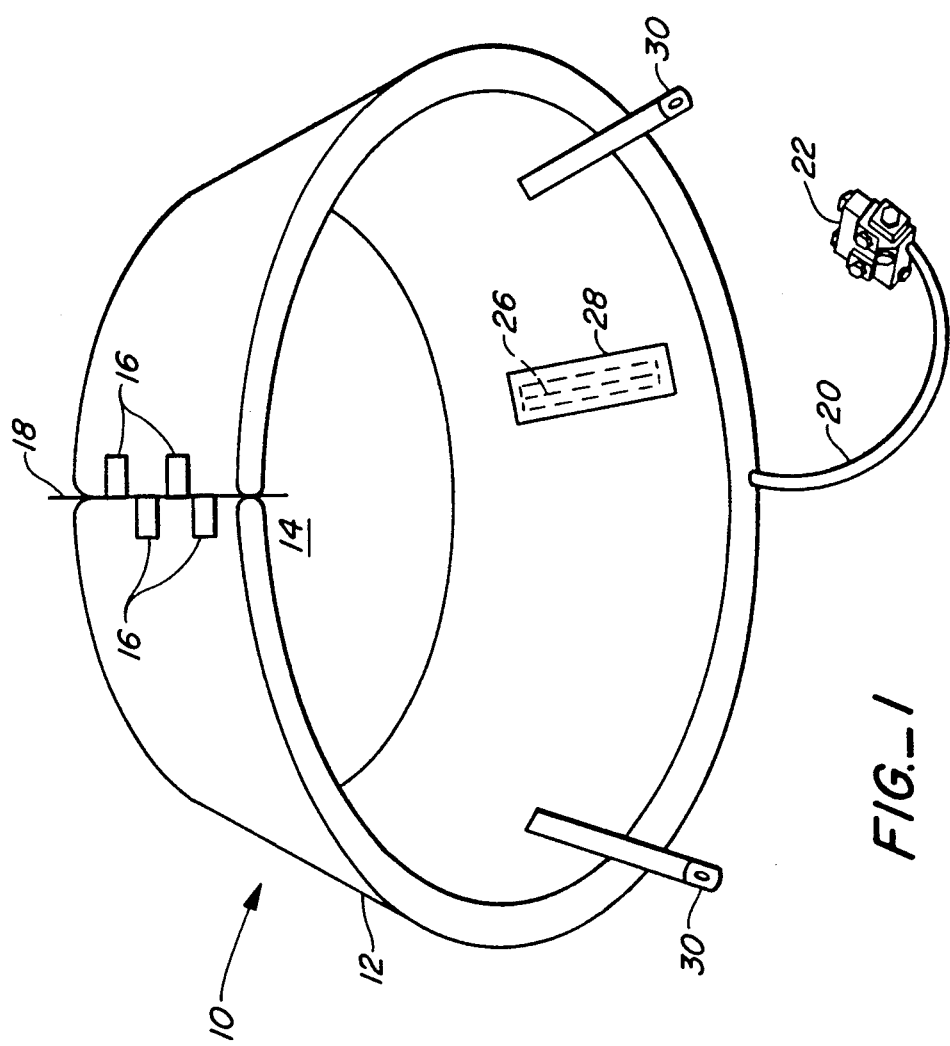
FIG._1

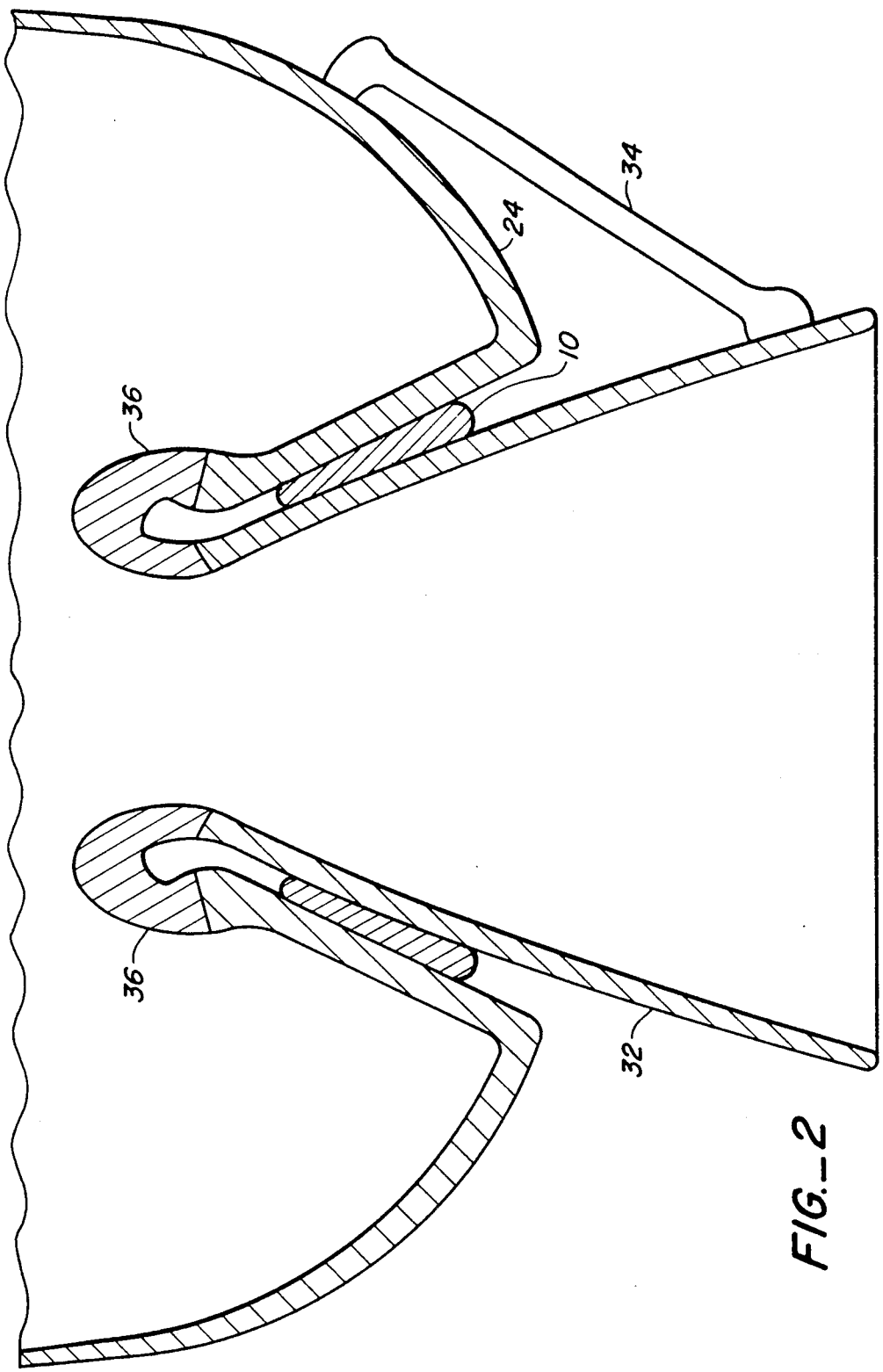
FIG._2

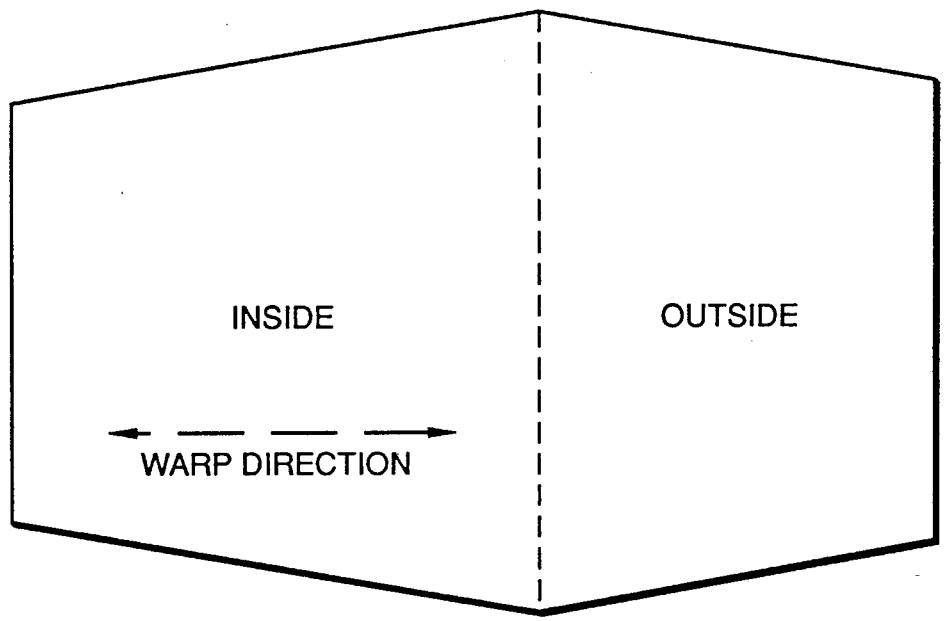
FIG._3
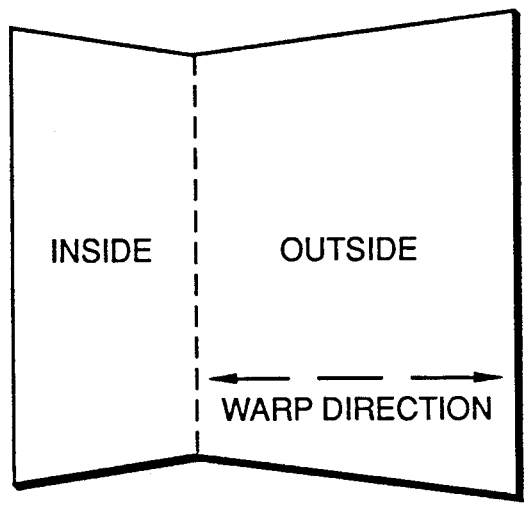
FIG._4

ROCKET NOZZLE SNUBBER

FIELD OF THE INVENTION

This invention pertains to a method and apparatus for limiting motion of a rocket nozzle and stress on the system at the time of rocket ignition.

BACKGROUND OF THE INVENTION

Rockets launched from beneath the water generally do not ignite the rocket motor until the rocket has cleared the water surface. During time between launch and ignition the nozzle of the rocket motor can be positioned by a hydraulic actuator system so that rocket orientation can be corrected on ignition.

Ignition of the rocket motor after underwear launch has been shown to produce undesirable stress forces on the rocket motor exit nozzle. These stress forces on the exit nozzle are transferred to the hydraulic actuator system and to the flexseal between the nozzle and the combustion chamber, potentially causing structural failure.

OBJECTIVES OF THE INVENTION

It is therefore a primary objective of the present invention to devise an apparatus to transfer stress from the nozzle actuators and the flexseal to the body of the rocket.

It is a further objective of such apparatus to not interfere with normal motion of the rocket nozzle.

SUMMARY OF THE INVENTION

These objects of the invention and other objects, features and advantages to become apparent as the specification progresses are accomplished by the invention according to which, briefly stated, a bladder in the shape of a conical torus is filled with incompressible fluid and is fitted between the nozzle and the body of the rocket. The snubber distributes stress from the nozzle to the main body of the rocket while deforming to permit the nozzle to be slewed from side to side to steer the rocket.

LIST OF ADVANTAGES OF THE INVENTION

An important advantage of the present invention is that it is simple and relatively inexpensive to make and use.

A further advantage is that it distributes the stress from the nozzle over a large area of the rocket body.

Another advantage is that it deforms easily to accommodate normal motion of the nozzle.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

BRIEF DESCRIPTION OF THE DRAWINGS

FIG. 1 is a perspective view of the snubber according to the invention.

FIG. 2 is a sectional view of the aft end of the rocket showing the position of installation of the snubber of FIG. 1.

FIGS. 3 and 4 are examples of patterns used to construct the bladder used in the snubber of FIG. 1

Glossary

The following is a glossary of elements and structural members as referenced and employed in the present invention.
- 10—snubber
- 12—bladder
- 14—closure
- 16—closure loops
- 18—closure pin
- 20—fill hose
- 22—fill block
- 24—main body of the rocket
- 26—slit
- 28—patch
- 30—locating straps
- 32—rocket nozzle
- 34—actuator
- 36—flexible joint

DESCRIPTION OF THE PREFERRED EMBODIMENTS

Referring now to the drawings wherein like reference numerals are used to designate like or corresponding parts throughout the various figrues thereof, there is shown in FIG. 1 a perspective view of the snubber 10 according to the invention. The snubber 10 is a hollow conical toroidal bladder 12 filled with incompressible fluid. The snubber 10 has a closure 14 which is a number of loops 16 through which a pin 18 fits like a hinge-pin in a hinge.

The snubber 10 according to the invention fits between the rocket nozzle 32 and the main body of the rocket 24 as shown in FIG. 2. The nozzle 32 is moved by a pair of actuators, only one 34 of which is shown. The nozzle 32 is attached to the main body 24 of the rocket through a flexible joint 36, the details of which are not shown here.

To install the snubber 10, a vacuum is drawn inside the bladder 12, the bladder 12 is wrapped around the nozzle 32 as shown in FIG. 2, the pin 18 is inserted into the loops 16, and then the bladder 12 is filled with fluid. To facilitate filling the bladder 12, a hollow tube 20 is attached at one end of the main body of the bladder 12 and at the other end to a valve 22 which is fastened to the main body 24 of the rocket.

The bladder 12 is formed of a flexible material, for example, a elastomer coated aramid fabric. In a preferred embodiment, the aramid fabric is Kevlar 49-383 in a 5 harness woven style, and the elastomer is silicone rubber. Silicone rubber patterns 30 mil thick are laid up and bonded to a plaster form to create a waterproof inner liner. Elastomer coated aramid fiber patterns for strength are then bonded over the inner liner. Silicone rubber patterns 25 mil thick are then bonded over the aramid layer for thermal insulation. The bladder is then cured under pressure to integrate these three layers and to create a seamless, one-piece bladder. At the end of the bladder 12 which is pointed toward the aft end of the rocket an additional cap of 160 mils of silicone rubber is bonded over the bladder 12 to provide additional insulation from the exhausts. A slit 26 is then made in the bladder 12 and the plaster form is washed out of the bladder 12 through the slit 26. A patch 28 is then formed over the slit 26.

FIGS. 3 and 4 show an example of patterns used to create pieces which form the bladder as described above. A number of pieces, 10 or more, are cut to each pattern. FIG. 3 shows a piece which is positioned with the dotted line on the aft edge of the bladder. FIG. 4 shows a piece which is positioned with the dotted line on the forward edge of the bladder. The pieces are overlapped by several inches at each joint to achieve sufficient strength at the joints.

To install the snubber, a vacuum is pulled inside the snubber causing it to collapse. The collapsed snubber is then wrapped around the nozzle and the pin inserted into the loops. Locating straps 30 are fastened to the nozzle 32 to hold the snubber 10 in place during the fill process. The bladder 12 is then filled with a mixture of 75% deionized water and 25% ethylene glycol or other incompressible mix containing fungicide to a pressure of about 10 psig.

This invention is not limited to the preferred embodiment and alternatives heretofore described, to which variations and improvements may be made, without departing from the scope of protection of the present patent and true spirit of the invention, the characterisitcs of which are summarized in the following claims.

We claim:

1. A snubber for transferring stress from the nozzle of a rocket to the main body of the rocket, comprising:
    a flexible hollow conical toroid filled with incompressible fluid fitted between the rocket nozzle and the main body of the rocket.

2. The snubber of claim 1 in which said hollow concical toroid if formed of a woven aramid fiber bonded inside and out to layers of silicone rubber.

3. The snubber of claim 2 in which said incompressible fluid is water with a fungicide.

* * * * *